United States Patent [19]
Pettit

[11] 3,737,055
[45] June 5, 1973

[54] STORABLE ELEVATING PLATFORM

[76] Inventor: Charles A. Pettit, 20011 Bernist Avenue, Torrance, Calif. 90503

[22] Filed: May 4, 1971

[21] Appl. No.: 140,150

[52] U.S. Cl. ............214/77 P, 214/130, 214/DIG. 10
[51] Int. Cl. ..............................................B60p 1/44
[58] Field of Search....................214/77 R, 77 P, 130, 214/DIG. 10, 1 BD

[56] References Cited
UNITED STATES PATENTS

| | | | |
|---|---|---|---|
| 2,469,321 | 5/1949 | Wood | 214/77 P |
| 3,545,791 | 12/1970 | Lugash | 214/77 P |
| 3,589,537 | 6/1971 | Petersen | 214/77 P |
| 3,369,678 | 2/1968 | Robinson | 214/77 P |
| 2,719,637 | 10/1955 | Wood | 214/77 P |

*Primary Examiner*—Robert J. Spar
*Attorney*—Allen A. Dicke, Jr.

[57] ABSTRACT

Storable elevating platform, particularly useful for attachment to trucks and other vehicles to raise and lower loads with respect to truck floor level, which platform can be tilted under the floor of the truck bed for storage when in nonuse and when the truck is traveling. A main support tube is rigidly secured transversely of the truck below the truck floor and forward of the edge thereof. Compression arms are pivoted to the platform and around the main support tube. Tension members having chain links, at least at the ends thereof, wrap around the main support tube and cam lobes on the platform. As the compression arms are raised, the tension members retain the platform substantially level. The platform is pivoted to the compression arms to permit the platform to be folded up and forward under the truck floor when not in use.

13 Claims, 8 Drawing Figures

PATENTED JUN 5 1973 3,737,055

INVENTOR
Charles A. Pettit,
BY
Allen A. Dicke, Jr,
AGENT.

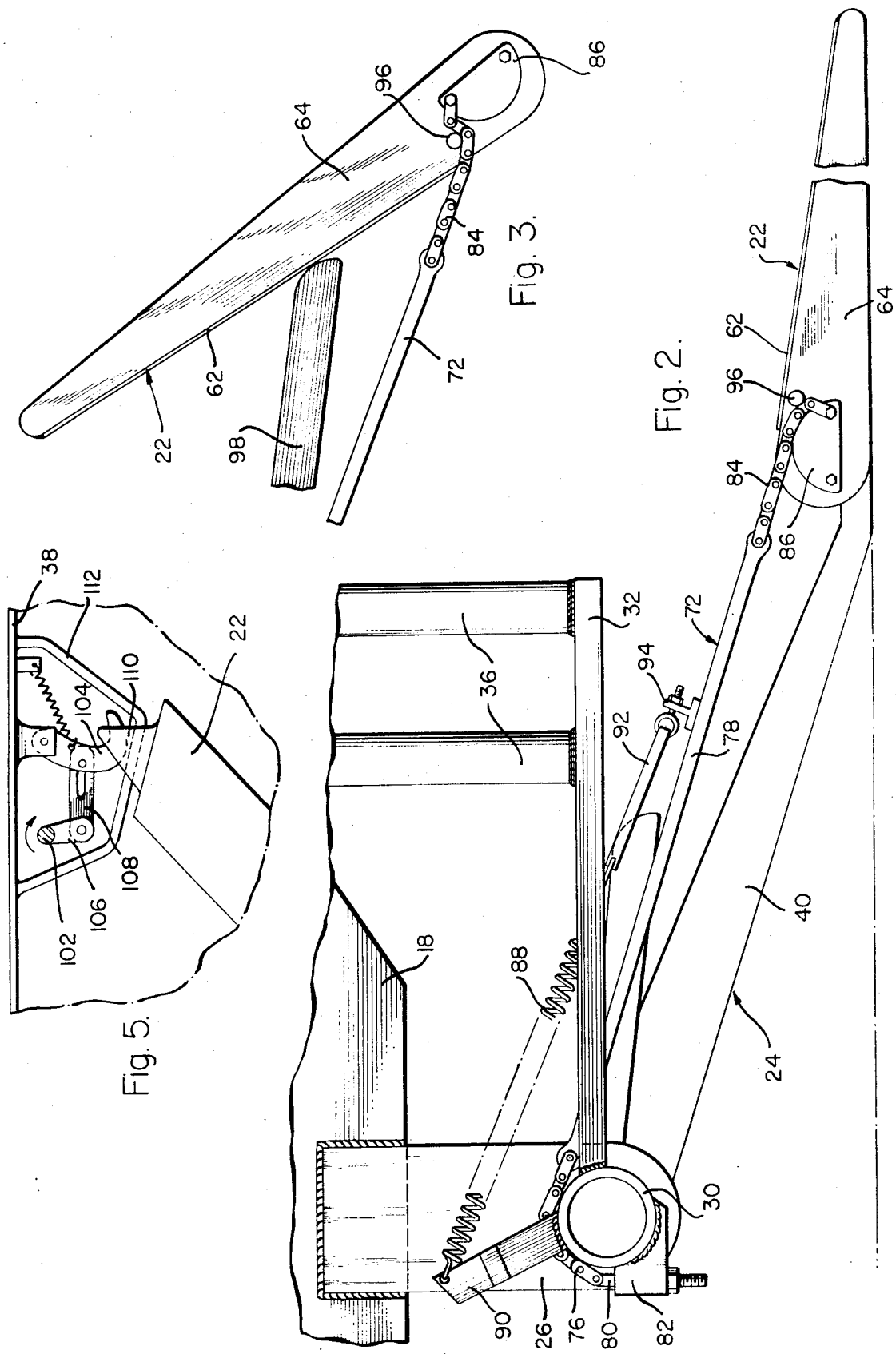

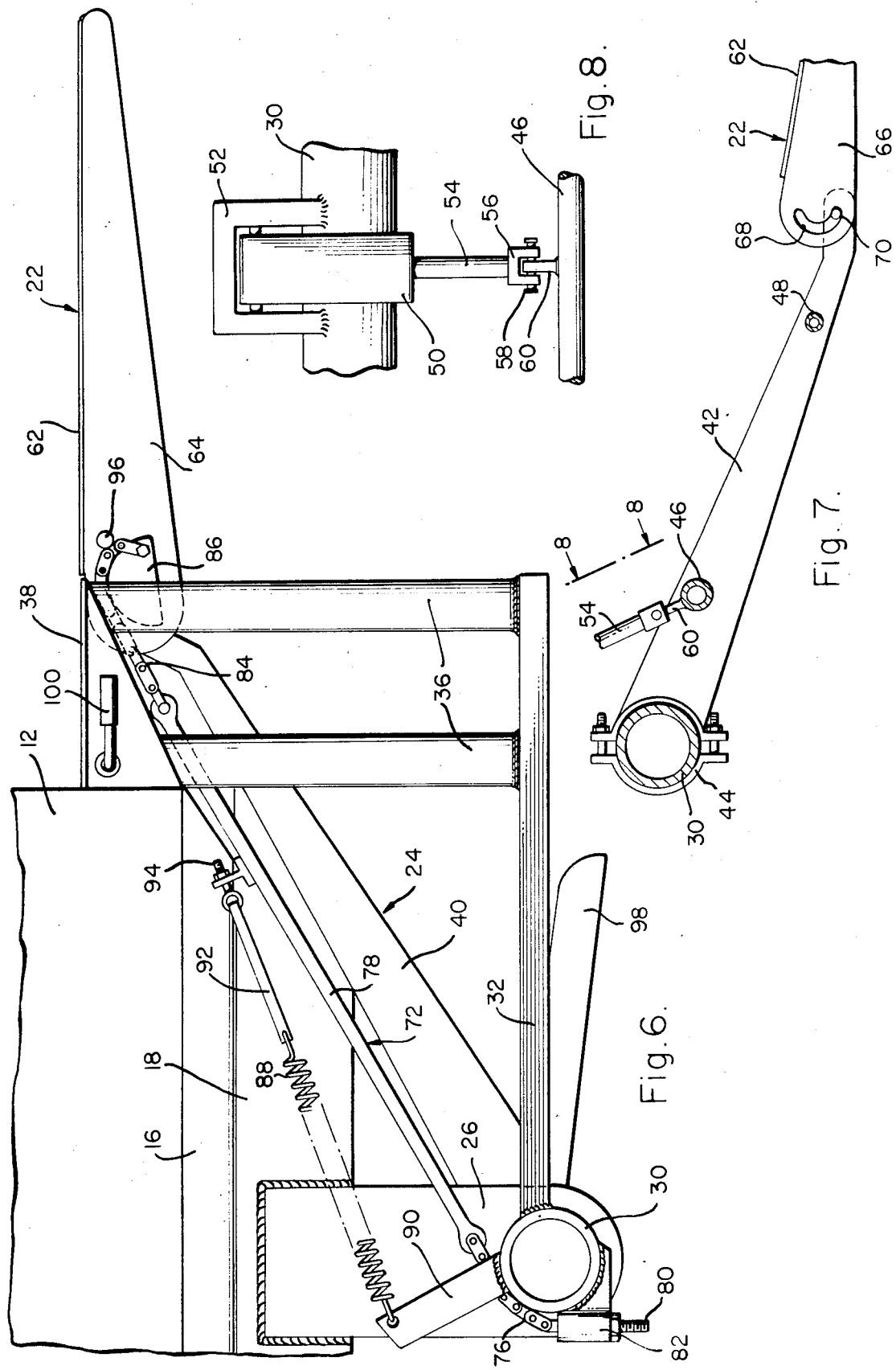

STORABLE ELEVATING PLATFORM

BACKGROUND

This invention is directed to a storable elevating platform, particularly for use with trucks and is similar to tailgate lifts, power raising tailgates and other devices for raising and lowering loads with respect to the floor of a truck.

With increasing mechanization and higher labor costs, it became apparent in technological advance that mechanization for hoisting loads with respect to truckbed level would be developed. Several types have been made available to truck users. One of the first concepts is to employ a normal truck tailgate, or a substitute therefor, as such a load-raising and lowering device. The tailgate normally stood in the vertical position at the rear of the truckbed and, from this application, the term "liftgate" has become fairly generic. The tailgate was swung from its vertical position wherein it serves as a tailgate for the truck floor, to a horizontal position substantially at the level of and substantially parallel to the floor. Thereupon, load could be placed from truck floor onto the liftgate. Lowering the gate would lower the load. Raising of a load was accomplished in the opposite manner.

A substantially parallelogramic arm structure was employed to maintain the liftgate in fairly level position throughout its entire lifting motion. The relationship of the parallelogramic arms permitted cantilevering of the liftgate and the strength of these parallelogramic arms generally determined the load limit of the gate.

Since it is inconvenient for the liftgate to extend out rearwardly from the truck floor during truck operation, and other nonuse of these prior liftgates, tilting of these gates from their lift position to a storage position has been employed. One of the problems, of course, arises from the parallelogramic linkage which normally prevents dropping of the outer edge of the cantilevered tailgate. Special pivots and special hinges permitted such folding action in prior structures.

Several prior storage positions have been employed. As previously discussed, one of them included an upstanding platform which served as the tailgate for the truck, during nonuse of the platform as a lift device. Other prior devices incorporated double folding into a position beneath the truck floor at the rear thereof, with double folding pivots necessitated by the liftgate hinge structure. All of these structures were quite complex and do not fully satisfy the requirement that they be economic, sturdy, and reliable. In the past, whenever folding has been employed, special pivot structures have been necessary.

SUMMARY

In order to aid in the understanding of this invention, it can be stated in essentially summary form that it is directed to a storable elevating platform which is of particular use for raising and lowering loads with respect to the floor level of the truck. The elevating platform comprises a platform supported on compression arms and held up into a substantially level position by means of tension members, including a flexible portion of said tension members engaged around a cam surface on the lift platform, and engaged on the opposite end around a main support tube of the elevating platform mechanism.

Accordingly, it is an object of this invention to provide an elevating platform of economic and reliable construction which provides a long life for lifting and lowering loads. It is a further object to provide an elevating platform which is supported in cantilever fashion from a parallelogramic structure, including flexible tension members. It is still another object to provide a storable elevating platform which takes advantage of flexible tension members to permit swinging the platform from the lifting position into the storage position. It is still another object to provide the liftgate which can be conveniently and readily operated from a stored to a lowered and to a raised position.

Other objects and advantages of this invention will become apparent from a study of the following portion of the specification, the claims, and the attached drawings.

BRIEF DESCRIPTION OF THE DRAWINGS

FIG. 2 is an enlarged side-elevational view thereof, with parts broken away.

FIG. 3 is a view similar to FIG. 2, with further parts broken away, and showing the elevating platform pivoted up to an intermediate position from which it is raised to the storage position.

FIG. 5 is a further enlarged detail, taken partly in side elevation and partly in section showing the latch structure which aids in retaining the elevating platform in the storage position.

FIG. 6 is a view similar to FIG. 2, but showing the platform in the raised position.

FIG. 7 is a detail taken partly in side elevation and partly in vertical section.

FIG. 8 is a view of the cylinder taken generally along the line 8—8 of FIG. 7.

DESCRIPTION

Figure 4:
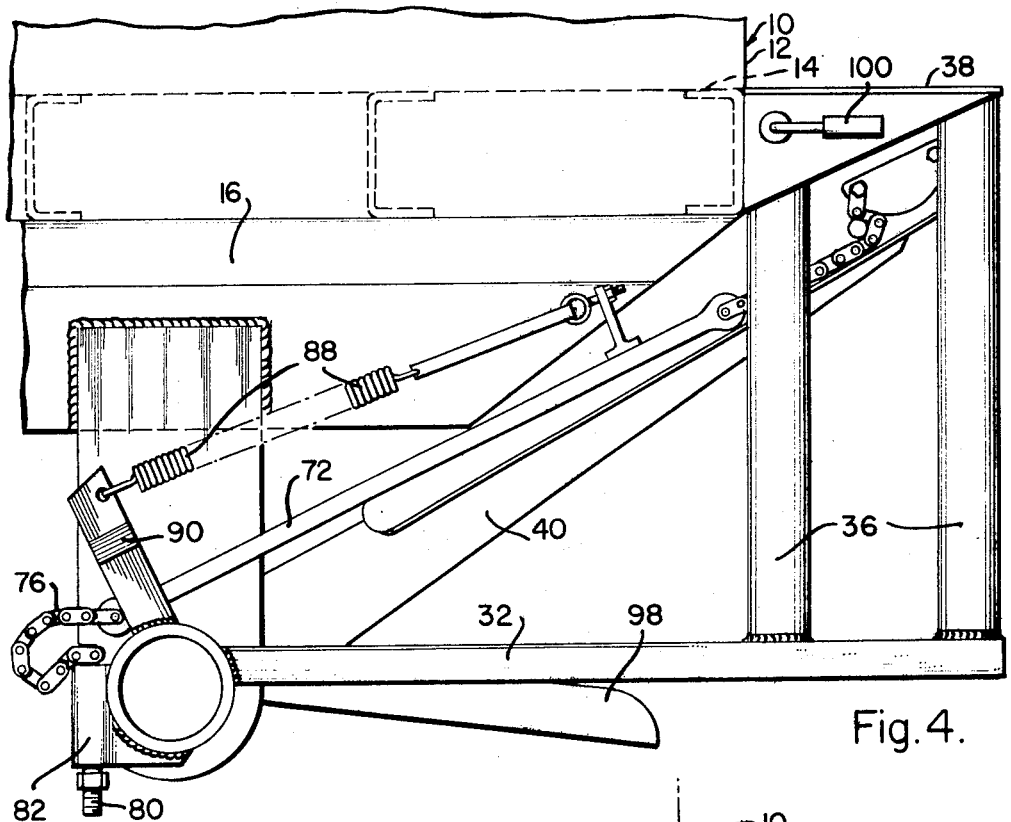
FIG. 4 is a view similar to FIG. 2, but showing the storable elevating platform in the storage position.

The storable elevating platform of this invention is particularly useful with trucks, as described above. The preferred embodiment is described with respect to a truck, but it is clear that the elevating platform structure can be employed as a loading dock of adjustable height, or other similar structure. Similarly, while the elevating platform is described as being attached to the rear of the truck, this is the most convenient location, but it can be applied to other locations. Sometimes a use requirement suggests that a smaller platform be attached to the side of the truck, and this employment is within the scope of use of the elevating platform of this invention.

To illustrate the manner of employment and attachment of the storable elevating platform of this invention, it is shown as being associated with a truck 10, but is subject to the other usages and attachments broadly described. Truck 10 has a cargo box 12 which includes a floor 14. Floor 14, and the entire cargo box, is supported upon stringers 16. The truck has a frame 18 upon which stringers 16 are mounted for support of the cargo box.

Figure 1:
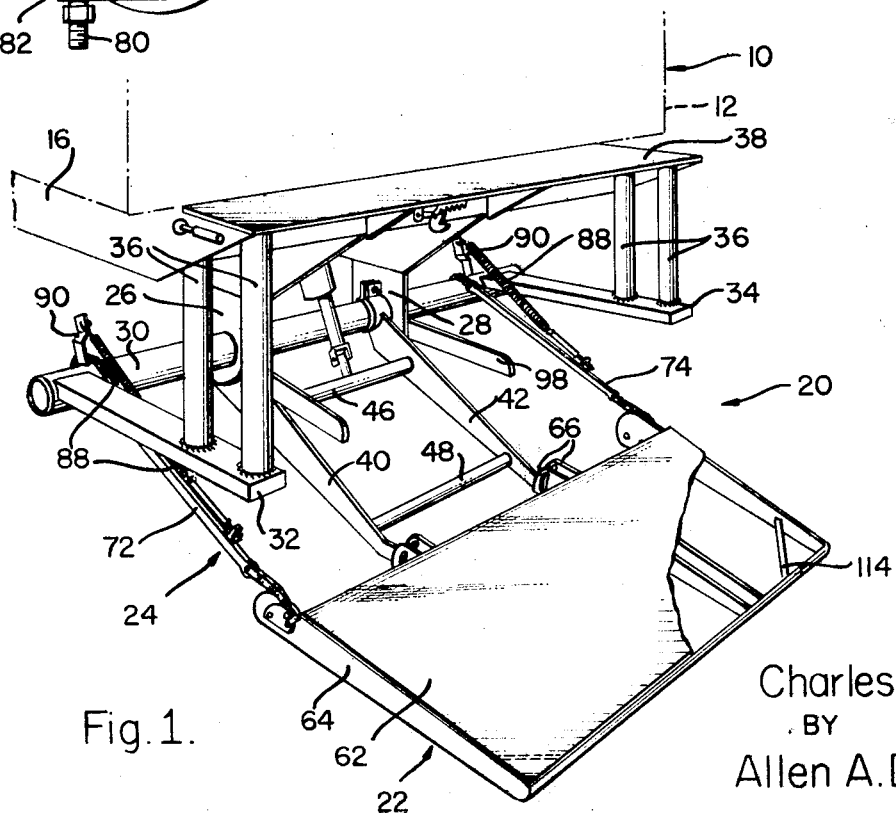
FIG. 1 is a perspective view of the storable elevating platform of this invention shown as applied to the rear end of a truck, and shown in the lowered position.

The storable elevating platform of this invention is generally indicated at 20 in FIG. 1. It comprises a platform 22 and platform support means 24. Brackets 26 and 28 are secured to and depend downwardly from the truck frame 18, on opposite sides thereof, and toward the rear thereof. These brackets provide a substantial portion of the support of the platform structure 20 and, thus, are firmly secured and of good strength. Main support tube 30 passes through and is secured to the brackets 26 and 28, and is positioned transversely of the truck. It extends in the widthwise direction substantially equally to the width of platform 22.

The outer ends of tube 30 respectively carry supports 32 and 34 from which uprights 36 extend. There are two uprights on each of the supports 32 and 34, although only one may be used. The rearward upright serves as a dock bumper. The principal use of the uprights is for the support of floor extension 38 which is of the same approximate height as the truck floor 14. The employment of two uprights 36 on each of the supports 32 and 34 permits the installation of a ladder crosspiece, if such is helpful in use of the platform. Floor extension 38 is secured to the stringers 16 under the cargo box of the truck and to such other parts of the cargo box as may be convenient. Thus, the supports 32 and 34, as well as uprights 36, serve for mutual support between the ends of main support tube 30 and the floor extension on the cargo box.

FIGS. 1 and 7 show arms 40 and 42. These arms are the compression arms in a substantially parallelogramic linkage which supports the platform 22 and permits its movement from its lowered to its raised position. As illustrated in FIGS. 1 and 7, arms 40 and 42 embrace tube 30 by means of an adjustable bearing structure wherein a bearing cap 44 is engaged around main support tube 30 and is adjustably secured with respect to the bearing half on the end of the compression arms by means of nuts and bolts. This provides for a large area of bearing, which reduces wear and reduces loading pressures, to result in a long bearing life. Suitable lubrication devices, such as grease fittings, are preferably employed.

Arms 40 and 42 pivot around the tube 30 on the bearings indicated, and are secured to each other by cross tubes 46 and 48, which maintain them in parallel positions. FIGS. 1, 7, and 8 illustrate cylinder 50 being pivotally mounted under bridge 52 which is secured to main support tube 30. Cylinder 50 has a piston rod 54 which can be extended from or withdrawn into cylinder 50 by means of conventional hydraulic fluid under pressure, controlled by conventional valves. The lower end of piston rod 54 carries a clevis 56. Pin 58 passes through clevis 56 and lug 60. Lug 60 is secured to cross tube 46. This provides a pivotal connection between clevis 56 and lug 60. Furthermore, if adjustment of extension length is desired, clevis 56 can be adjustably secured to piston rod 54, as by screwthreads, to provide suitable length adjustment. By this construction, it is clear that withdrawal of the piston rod into cylinder 50 raises cross tube 46, while extension of the rod from the cylinder lowers cross tube 46.

Since the cross tube is secured to both of the compression arms 40 and 42, and these are pivoted at their upper ends on main support tube 30, it is clear that this causes these arms to swing up from the lowered position of FIGS. 1, 2, and 7 to a raised position of FIG. 6.

Platform 22 preferably has a continuous top 62 which is mounted on a plurality of supports. These supports are continuous and extending from front to back of the platform (in the front-to-back direction of truck 10) and the outermost supports are symmetrically identical. The nearest support in FIGS. 1, 2, 3, 4, and 6 of the drawings can be considered one of the two side supports. It is indicated by the numeral 64. These supports are preferably in channel form, in order to give the requisite strength to the platform 22. Alternatively, flat plates on edge or box sections can serve as the support members.

Two additional supports are also illustrated, this being the minimum number of supports in the preferred embodiment. The center supports are identical, and one is illustrated at 66 in FIG. 7. The central support 66 illustrates its double wall character in FIG. 1. The forward end of the central support 66 carries an arcuate bearing slot 68. Compression arm 42 extends between the two sides of central support 66 and cross pin 70 extends through bearing slots 66 and is secured in arm 42. The cross pin is located at the bottom of bearing slot 68 in the position shown in FIGS. 1, 2, and 7 when the platform 22 is in the lowered position of FIG. 1 or the raised position of FIG. 6, or any position intermediate therebetween. It moves into the other end of this slot only when the platform is moving from the lowered position of FIG. 1 into the storage position of FIG. 4. Compression arms 40 and 42 serve as the one side of a substantially parallelogramic structure. The arms 40 and 42 pivot on the center line of main support tube 30 and the cross pins 70.

FIGS. 2 and 6 best illustrate the tension structure which maintains the platform 22 in substantially level position between the lowered and the raised platform. The tension structure is comprised of tension members 72 and 74. These are identical, and the one shown in the near side of the drawing is more conveniently explained. The forward end of tension member 72 includes a series of roller chain links 76. On their rearward end, they are secured to bar 78. They wrap around main support tube 30, and are secured to bolt 80 which passes through boss 82 secured to tube 30. The nut on bolt 80 beneath the boss permits adjustment of the overall effective length of tension member 72. Chain 76 is preferably of the nature of a roller chain which presents flat plates lying edgewise on the circumference of tube 30. The radius distance between the center line of tube 30, on which the compression arms rotate, and the center line of the chain 70 corresponds to one of the short arms of the substantially parallelogramic structure.

The lower end of bar 78 carries chain 84. Cam 86 is secured to the outer face of side support 64. Cam 86 is preferably of such thickness that the side plates of roller chain 84 embrace the cam, for sideways security. Cam 86 has an effective surface which is cylindrical. The radius from the center of the cam circle to the center line of chain 84 is preferably substantially the same as the distance from the center of tube 30 to the center line of the chain wrapped therearound. By this construction, if the center of cam 86 is located upon the axis of pin 70, a perfect parallelogramic support results. However, it is desirable for the platform to have its nose tipped down to the ground in the lowered position, as shown in FIG. 2, while the platform is level in the raised position, as shown in FIG. 6. This is accomplished by offsetting the cam 86 so that the structure is not quite parallelogramic. As the platform moves between the lowered and raised position, one of the chains wraps while the other one unwraps with respect to its curved guide support. By operation of the cylinder 50, the platform moves from the lowered position of FIG. 2 to the raised position of FIG. 6. In the position of FIG. 6, the platform top 62 is in line with floor extension 38. The platform top is dimensioned so that they meet substantially edge-to-edge for convenient transfer of materials from the floor extension to the platform, and vice versa. By this means, materials are moved substantially from ground level to the truck floor level, and vice versa.

As previously discussed, the truck cannot proceed with the platform 22 in the raised position as shown in FIG. 6. The platform must be put in an out-of-the-way position so that it is not a danger while driving. It is desirable to place the platform 22 in such a position that the truck can be backed up against an ordinary loading dock, without the need to employ the platform 22. Thus, it is preferable that the platform not be raised to a vertical position, where it serves as a tailgate, but in accordance with the preferred embodiment of this invention, that the platform 22 be tilted under the truck body at the rear thereof.

Since tension member 72 is not the member of compressional strength, platform 22 can be manually pivoted by lifting its rearward edge upward. Furthermore, this manual lifting is aided by means of tension spring 88. The forward end of tension spring 88 is hooked on spring bracket 90. This bracket is secured to main support tube 30. The rearward end of tension spring 88 is engaged in strap 92, which in turn is adjustably secured to bracket 94 secured to bar 78. Spring 88 maintains tension on chain 84, and the torque resulting from this tension force aids in lifting the rearward edge of platform 22. As the platform 22 is manually raised to the vertical position, pin 96 is positioned to engage the chain 84 and prevent the chain from following the full radius of its action. Thus, the effectiveness of the spring to produce a counterclockwise torque is reduced as the platform reaches its vertical position. During this raising, the pin 70 moves to the opposite end of arcuate slot 68, so that the pivot point during the manual lifting procedure is at the upper end of slot 68.

The platform 22 is swung upward until it passes between the uprights 36, and with further inward tilting, it engages guides 98. The first engagement with the guides 98 is shown in FIG. 3. From this position, cylinder 50 is powered to raise arms 40 and 42. As the arms raise, the platform 22 tilts down over the guides 98 until the arms 40 and 42 engage on the now downwardly directed platform top 62. From this position, the arms move upward to the fully raised position of FIG. 4. During this entire motion, from the first manual lifting of the rearward edge of platform 22, chain 76 has been slack. However, spring 88 keeps the tension member 72 under control, despite the slackness of the chain 76, which is illustrated in FIG. 4.

A conventional control handle 100 is mounted to be available to the operator of platform 22. Preferably, a handle is available on each side of the truck, beneath floor extension 38. Cross shaft 102 is connected between these handles, and is connected to operate the hydraulic control valve which drives cylinder 50, in conventional manner. As previously stated, hydraulic fluid under pressure is received by the valve and is directed to the cylinder by conventional means.

As a protective device, latch 104 is pivotally attached to the underside of floor extension 38. It is shown under the center of floor extension 38 in FIG. 1 and in detail in FIG. 5. It is connected by bellcrank 106 and link 108 to be operated from cross shaft 102. A spring urges the latch hook toward the engaged position. The back edge of platform 22 carries latch member 110 positioned so that, when the platform 22 is moved to the raised, stowed position, the hook engages with the latch member 110. This holds the platform in its stowed position even in the event of hydraulic failure. A gusset strengthens latch member 110, and guard 112 stands next to the latch hook mechanism to protect it from damage. The structure is such that, when the handle 100 is moved to a position which calls for lowering the platform 22 out of its stowed position, the hook disengages. Upon such lowering, as the arms 44 and 42 pass below guides 98, the platform is swung partway forward, to the position of FIG. 3. From this position, it is manually swung outward to the horizontal, lowered position of FIG. 2, by use of the handle 114 on either side of platform 22.

When the platform is in the stowed position, there is clearance below the floor extension and above the now raised rear edge of the platform. This space permits mounting of lights at the rear of the truck, underneath the floor extension, which lights are visible to the rear. All legally-required rear facing lights can be placed at the lower rear of the truck. In this location, they are visible with the platform in the stowed position and are out of the way of platform or cargo box rear door movement. Additionally, they are protected by being positioned under the floor extension.

The guide arms about which the platform swings as it moves into and out of stowed position define a zone in which the platform cannot move. Thus, a trailer hitch can be connected to the truck frame or the main support tube and extend into a central position approximately below these guide arms. In this position, the trailer hitch does not interfere with platform motion, either in the elevating and descending mode or as the platform is moved into stowage position.

By this means, a fully-adjustable, economic, but fully secure storable elevating platform is accomplished. This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. An elevating platform for moving from a lowered position to a raised position, said platform comprising:
   a fixed non-rotative main support, a curved exterior surface on said support, said curved exterior surface having an axis;
   at least one support arm having an inner end pivotally mounted upon said fixed main support away from the axis of its curved surface and having an outer end;
   a platform pivotally mounted on the outer end of said support arm, a curved surface on said platform;
   a flexible tension member engaged around said curved surface on said support and around said curved surface on said platform so that tension in said flexible tension member controls the level of said platform as said support arm pivots on said support.

2. An elevating platform for moving from a lowered position to a raised position, said platform comprising:
a fixed non-rotative main support, a curved substantially cylindrical exterior surface on said support, said curved substantially cylindrical external surface having an axis;
at least one support arm having an inner end pivotally mounted upon said substantially cylindrical surface of said fixed main support and said support arm pivots substantially on the cylindrical axis of said main support, said support arm having an outer end; a platform pivotally mounted upon a platform pivot axis on the outer end of said support arm, a curved surface on said platform, said curved surface having no substantial axis of curvature on the pivot axis of said platform on the outer end of said support arm; and
a flexible tension member engaging around said curved surface on said support and around said curved surface on said platform so that tension in said flexible tension member controls the level of said platform as said support arm pivots on said support.

3. The elevating platform of claim 2 wherein said main support is a main support tube and wherein there are first and second support arms, said support arms being engaged around and bearing on the outside of said main support tube at the inner ends of said support arms.

4. The elevating platform of claim 3 wherein the exterior surface of said main support tube is the curved surface upon which said flexible tension member engages so that the center of curvature thereof lies on the same axis as the pivot axis of said arms on said main support tube.

5. The elevating platform of claim 4 wherein said curved surface on said platform is a cylindrical surface, the center of which is spaced away from the pivot axis of said platform on the ends of said support arm.

6. An elevating platform for moving from a lowered position to a raised position, said platform comprising:
a fixed non-rotative tubular main support having a curved substantially cylindrical exterior surface, said curved exterior surface having an axis;
first and second support arms each having an inner end, said inner ends of said support arms being engaged around and bearing on the exterior cylindrical surface of main support tube at the inner ends of said support arms;
a platform pivotally mounted on the outer end of said support arm to pivot on said support arms on a platform pivot axis an arcuate slot in said platform and a pivot pin on the outer end of said support arm engaged in said arcuate slot to define the pivot axis of said platform on said support arms, a curved surface on said platform, said curved surface having at least a principal axis of curvature, said principal axis of curvature being spaced away from the pivot axis of said platform; and
a flexible tension member engaged around said cylindrical exterior surface of said main support tube and around said curved surface on said platform so that tension in said flexible tension member controls the level of said platform as said support arms pivot on said main support tube.

7. The elevating platform of claim 6 wherein guide means is positioned on said platform adjacent said flexible tension member adjacent its wrap around said curved surface on said platform so that said tension member is restrained adjacent said curved surface when said platform is pivoted on the end of said arm.

8. An elevating platform for moving from a lowered position to a raised position, said platform comprising:
a fixed non-rotative main support, a curved exterior surface on said main support, said curved exterior surface having an axis;
at least one support arm having an inner end, said inner end being engaged upon said curved exterior surface of said main support and being pivotally mounted thereon, said support arm having an outer end;
a platform pivotally mounted on the outer end of said support arm, a curved surface on said platform;
a flexible tension member engaged around said curved surface on said support and around said curved surface on said platform;
guide means positioned on said platform adjacent said flexible tension member adjacent its wrap around said curved surface on said platform so that said tension member is restrained adjacent said curved surface when said platform is pivoted on the end of said support arm, the tension in said flexible tension member controlling the level of said platform as said support arm pivots on said support.

9. The elevating platform of claim 8 wherein one end of said flexible member is adjustable with respect to its curved surface so that the level of said platform can be adjusted.

10. The elevating platform of claim 8 wherein tension spring means is connected between said flexible member and said main support to hold said tension member taut with respect to said platform when said platform is pivoted up on the end of said support.

11. The elevating platform of claim 10 wherein a floor is positioned even with the raised position of said platform, and said support arm and said platform are shaped so that said platform is movable into a storage position below said floor, and when in said storage position, said platform is spaced below said floor.

12. The elevating platform of claim 1 wherein a floor is positioned even with the raised position of said platform, and said support arm and said platform are shaped so that said platform is movable into a storage position below said floor, and when in said storage position, said platform is spaced below said floor.

13. The elevating platform of claim 1 wherein a floor is positioned substantially even with the raised position of said platform, supports secured to the said fixed main support and extending beneath said floor, uprights extending from said supports to said floor, said supports and said uprights being positioned so that said support arms, said platform and said flexible tension member pass between said supports and said uprights as said platform moves from its lower position to its raised position.

* * * * *